United States Patent
Madhow

(10) Patent No.: US 8,144,668 B1
(45) Date of Patent: Mar. 27, 2012

(54) MULTIUSER DETECTION AND INTERFERENCE SUPPRESSION TECHNIQUES FOR DIRECT SEQUENCE SPREAD SPECTRUM SYSTEMS IN WHICH ALL USERS EMPLOY SAME SPREADING CODE

(75) Inventor: Upamanyu Madhow, Santa Barbara, CA (US)

(73) Assignee: Meru Networks, Sunnnyvale, CA (US)

( * ) Notice: Subject to any disclaimer, the term of this patent is extended or adjusted under 35 U.S.C. 154(b) by 626 days.

(21) Appl. No.: 12/272,364

(22) Filed: Nov. 17, 2008

Related U.S. Application Data

(63) Continuation of application No. 11/164,868, filed on Dec. 8, 2005, now Pat. No. 7,453,855.

(51) Int. Cl.
*H04B 7/216* (2006.01)
*H04B 1/00* (2006.01)
*H04J 9/00* (2006.01)
*H04J 3/22* (2006.01)

(52) U.S. Cl. ......... 370/335; 370/204; 370/465; 375/140

(58) Field of Classification Search .................. 370/335, 370/203–204, 252, 464, 465; 375/140–143
See application file for complete search history.

(56) References Cited

U.S. PATENT DOCUMENTS

| | | | |
|---|---|---|---|
| 5,337,397 A | 8/1994 | Lebby et al. | |
| 6,128,329 A * | 10/2000 | Takakusaki | 375/140 |
| 6,658,047 B1 | 12/2003 | Komulainen et al. | |
| 6,940,837 B1 * | 9/2005 | Kotake | 370/335 |
| 6,959,053 B2 * | 10/2005 | Gerhards et al. | 375/343 |
| 7,088,699 B1 * | 8/2006 | Hottinen et al. | 370/342 |
| 7,453,855 B1 | 11/2008 | Madhow | |
| 7,551,663 B1 * | 6/2009 | Proctor, Jr. | 375/147 |
| 7,633,995 B1 * | 12/2009 | Giallorenzi et al. | 375/148 |
| 8,064,497 B2 * | 11/2011 | Jonsson et al. | 375/148 |
| 2003/0112852 A1 * | 6/2003 | Kondo | 375/141 |
| 2003/0198305 A1 | 10/2003 | Taylor et al. | |
| 2004/0213329 A1 * | 10/2004 | Yano et al. | 375/142 |
| 2005/0111405 A1 | 5/2005 | Kanterakis | |

* cited by examiner

*Primary Examiner* — Warner Wong

(57) ABSTRACT

The present invention considers a direct sequence spread spectrum system wherein every user employs the same spreading code. In a preferred embodiment, received signal is correlated with the training signal. Peaks of correlator output are used to identify the delays corresponding to the significant multipath components. The delays that are within a predetermined number of chips of each other are associated with a hypothesized user. In an alternate embodiment, a user separation technique is used which is based on the observation that after the training period, different users send uncorrelated data. In another alternate embodiment, linear minimum mean squared error (LMMSE) based correlators locked to individual users are employed. These correlators only provide multipath components of their corresponding users as output.

10 Claims, 3 Drawing Sheets

MULTIUSER DETECTION AND INTERFERENCE SUPPRESSION TECHNIQUES FOR DIRECT SEQUENCE SPREAD SPECTRUM SYSTEMS IN WHICH ALL USERS EMPLOY SAME SPREADING CODE

BACKGROUND

The present invention relates to the field of direct sequence spread spectrum systems and deals more particularly with multiuser detection and interference suppression in direct sequence spread spectrum systems in which all users employ same spreading code, in multipath environments such as indoor conditions. Wireless communication has become one of the most indispensable technologies of modern world. In the beginning, time division and frequency division multiplexing techniques were used for communicating multiple signals using one channel. In these techniques, frequency of conventional wireless signals, like as in a conventional radio, remains constant. Hence, the bandwidth is limited in these techniques. Also, the transmitted data can very easily be retrieved by anyone having access to the bandwidth used. However, these techniques have certain limitations associated with them. Firstly, the signal is subject to interference from other signals having frequencies that are same or are close to the frequency of the signal. Interference can be deliberate, like jamming, or unintended, like side channel interference in conventional radio transmission. Interference from other signals affects the quality of communication and it becomes difficult to recover the signal at the receiver. Secondly, the signal is very easy to intercept, which is not ideal for situations where confidentiality of the information sent is of paramount importance.

Spread spectrum technology takes care of the shortcomings of conventional wireless communication technologies. Spread spectrum radio communication technology was developed for use by military because it resists jamming and uses wideband signals that are difficult to detect. It is only in the recent years that the utility of spread spectrum technology for commercial and industrial purposes has been realized.

Spread spectrum is a form of wireless communications in which the signal to be transmitted is spread in order to occupy a bandwidth much greater than what is necessary to send the information. This makes the signal immune to interference, difficult to intercept and also makes multiuser access possible. Frequency hopping, time hopping and direct sequence are three ways to spread the bandwidth of a signal. In frequency hopping, the signal is switched across frequencies in the given bandwidth. In time hopping, the signal is transmitted in short bursts at different instances of time. In direct sequence, the data to be transmitted is directly coded at a high frequency. The data is said to be composed of symbols. Bandwidth of the signal is spread by means of a code that is independent of the data to be transmitted. The information data modulates the code. This code is called spreading code and it is a pseudo-random code. The resulting signal modulates a carrier signal. The signal thus obtained is then amplified and transmitted. The spreading code can be short or long. A short spreading code is the one that has period equal to the symbol period of the information signal. A long spreading code is the one that is aperiodic or has period much greater than the symbol period. The same code is reconstructed at the receiver end so that synchronous detection is possible. The receiver synchronizes with the code to recover the data. The use of an independent code and synchronous reception allows multiple users to access the same frequency band at the same time.

Code division multiple access (CDMA) is a form of spread spectrum technology. The Direct Sequence Code Division Multiple Access systems will henceforth be referred as the DS-CDMA systems. In a typical DS-CDMA system, each user is allocated a different spreading code. It is the difference between the spreading codes that allows the receiver to discriminate between different simultaneous transmissions. IS-95 standard for digital cellular telephony and third generation (3G) cellular systems are based on DS-CDMA. In contrast to the typical DS-CDMA systems, there exist systems in which all users use the same spreading code. This means that every symbol sent by every user modulates the same spreading sequence, and the spreading code is a short spreading code. This type of a system is used in Wireless Local Area Networks, henceforth referred as WLAN, based on the IEEE 802.11b standard. This standard allows variable rates of data transfer, with allowed values being 1 Mbps, 2 Mbps, 5.5 Mbps and 11 Mbps. Signals sent at the rate of 1 Mbps and 2 Mbps are sent using direct sequence signaling. Spread Aloha system proposed by Abramson is another system in which multiple users access a channel randomly and modulate same short spreading code. The short spreading code in this case enhances the capture effect, in which a user may be able to capture the channel despite a collision. This is achieved by virtue of factors such as having higher power, or arriving at a smaller delay, so that the receiver can lock on to it and reject interference arising from collisions.

Like all wireless communication systems, Spread Spectrum systems face the problem of multipath phenomenon. When a radio frequency signal is transmitted, it comes across a lot of obstacles like walls, beams etc. Existence of a line-of-sight path or no obstacle path is very rare. The signal reflects or bounces from the surface of the obstacle. Due to this, the receiver may receive multiple delayed versions of the same signal. These delayed versions also have different gains associated with them depending upon the different paths followed by them. This is called as the multipath phenomenon. The different reflections of the same signal received are termed as multipath components. The multipath phenomenon adds to the complexity of signal reception in the Spread Spectrum systems. In case of DS-CDMA systems, different multipath components can be associated with different users on the basis of spreading codes associated with them. However, in case all users employ same spreading code, differentiating different users' signals becomes complicated. Considerable amount of research has been undertaken in the field of spread spectrum systems employing same spreading code for all users. Quite a few patents have been granted and research papers have been published in this regard. One such patent is recited below.

U.S. Pat. No. 5,537,397, titled "Spread ALOHA CDMA Data Communication" describes a system in which multiple transmitters transmit signals using identical spreading code and a single matched filter at the receivers receives all the signals. The matched filter transmits a control signal having the timing information of the received signal. This information is used to control the user transmission times at the chip level. At the receiver end, this information is used to differentiate between signals of different users.

A paper titled "Evaluation of the timing synchronization algorithms for the smart wireless LAN system" by G. T. Okamoto, published in 49th IEEE Vehicular Technology Conference, discusses timing synchronization algorithms that enable multiple (up to 11) users to use the same spreading code without a loss of the spreading gain. This paper considers an antenna array that is used to support Space Division Multiple Access (SDMA) in an 802.11b compatible wireless LAN.

One or more of the above described prior art suffers from one or more of the following drawbacks. Firstly, additional information is required to be sent along with the data in order to differentiate between different users' signals at the receiver. Secondly, all aspects are not taken care of to maximize the input power at the receivers end. For example, multipath phenomenon is not taken care of while receiving the signal.

From the discussion put forth, it is evident that there is a need for better receiver techniques for the direct sequence spread spectrum systems in which all users employ the same spreading code. There is need for techniques that can distinguish between the different users even though all users modulate the same spreading code without transmitting any additional information. Also, there is a need for techniques that identify multipath components of different users and reproduce the original transmitted signals.

SUMMARY

A general object of present invention is to differentiate between signals transmitted by different users in a Direct Sequence Spread Spectrum system where all users employ same spreading code, in a multipath environment.

Another object of the present invention is to separate the multipath components of a signal belonging to a user.

Yet another object of the present invention is to suppress interference due to signals of other users with the signal of the desired user.

A further object of the present invention is to separate signals from different users even if they are being transmitted in the same timing slot.

The present invention considers a Direct Sequence Spread Spectrum system wherein every user employs same spreading code. Typically, the present invention considers a setting that abstracts the key features of the 802.11b Direct Sequence physical layer. The information to be transmitted by the user modulates the spreading code. The modulated spreading code in turn modulates a high frequency carrier signal, which is then amplified and transmitted. Since all users employ same spreading code, the signals of different users cannot be separated on the basis of the spreading code. User separation becomes even more difficult when signals of multiple users collide. By collision it is meant that all users start transmission in the same slot with the same sequence of training symbols. The present invention describes a method to separate the multipath components of these signals to reproduce the original signal. The present invention tackles two scenarios. In one scenario, the timing of two or more users is offset sufficiently so that most significant contribution to the observation interval for each user corresponds to different symbols. Typical of this scenario are large indoor areas such as lobbies, lecture halls, where many users are located near each other and see statistically similar multipath environments. In another scenario, the timing of the two or more users is closely aligned, so that the same training symbols make major contributions in the observation interval. This situation is typical in longer range communication links for example an access point that covers a large area with sparsely populated users.

The present invention proposes synchronization of the receiver with the received signal using standard synchronization methods and using Linear Minimum Mean Squared Error (LMMSE) correlators. Using standard synchronization methods, received signal is correlated with the training signal. Each signal is said to consist of symbols. Symbols in turn consist of chips. Peaks of correlator output are used to identify the delays corresponding to the significant multipath components. This method provides the locations of the different significant multipath components. This implies that the delays corresponding to the significant multipath components are made available. The delays that are within a predetermined number of chips of each other are associated with a hypothesized user. The present invention also takes care of the post-training period when each user sends highly uncorrelated data. The set of delays corresponding to significant multipath components is partitioned into hypothesized users, with each user assigned a subset of delays. This partitioning is achieved by implementing a correlator that generates a sequence of demodulation statistics corresponding to each delay. Highly correlating demodulation statistics correspond to the same user.

In LMMSE based synchronization an approximation to the LMMSE correlator is computed under each of the timing hypotheses. On the basis of the LMMSE based correlator and the estimate of the desired vector under the hypothesized phase of the training sequence, a set of good timing hypotheses is formed. A correlator corresponding each of these hypotheses is defined which is locked to a user by design. This correlator is correlated against the shifts of the spreading sequence. The peaks of the correlator output are used for the separation of the multipath components belonging to different users.

Once the user level grouping of various signals is done, it is possible to use one of several techniques for demodulation. After separating signals from different users, a Rake receiver for each hypothesized user can be implemented at the receiver end. Also an interference suppressing Rake receiver can be implemented. After multiuser detection and interference suppression, the demodulation to obtain original transmitted signal should be apparent to anyone skilled in the art.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

Figure 1:
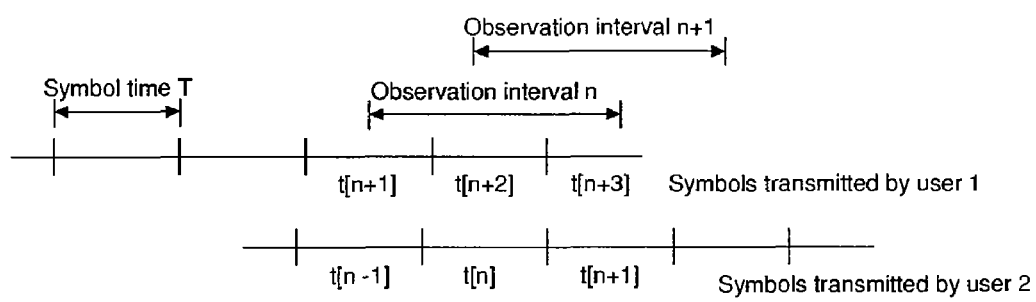
FIG. 1 shows the timing of two simultaneous transmissions of two users with the timing being offset sufficiently.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

The present invention provides a method for multiuser detection in which all users use same spreading code. In this case, where all users use same spreading code, it is not possible to employ the convention methods (standard synchronization & LMMSE based synchronization) for differentiating between the users based on their spreading codes. The present invention makes use of differences among the data sequences sent, and the channels seen by different users, to separate different signals.

System Model

Present invention considers a DS (Direct Sequence) system in which users transmit their signals simultaneously. A user is numbered by j where j is less than a number, K, and greater than or equal to 1. All users use same short spreading code, $s(t)$, to spread their information signal. The spreading code $s(t)$ is a periodic sequence with a period equal to symbol time of information signal. A low-pass equivalent received signal at receiver is given by:

$$y(t) = \text{Sum}_{over\ m} \text{Sum}_{over\ j=1\ to\ K} (b[j,m])(s*h_j)(t-mT) + n(t)$$

where,
$b[j,m]$ is the mth symbol sent by jth user,
$h_j$ is the channel seen by jth user,
$T$ is the time period of the information signal,
$n(t)$ is noise (typically modeled as White Gaussian Noise, (WGN)), and
s is the spreading code given by $$s(t) = \text{Sum}_{over\ I=0\ to\ N-1} c[i] p(t - iT_c)$$

where,
$T_c$ is the period of chip of spreading code,
$N = T/T_c$ is the processing gain i.e. the number of chips per symbol,
$\{c[i], i=0, \ldots N-1\}$ is the spreading code,
$p(t)$ is chip waveform, whose bandwidth matches the available channel bandwidth.

At receiver's end, the received signal is passed through a wideband filter. The wideband filter is matched to chip waveform, $p(t)$. Output of the matched filter is then sampled at a multiple of chip rate $1/T_c$. Window of samples, termed as an observation interval, is then used to obtain an equivalent synchronous model for the asynchronous system. The generic form for the equivalent synchronous model is:

$$r[n] = b_1[n] u_1 + \text{Sum}_{over\ j=2\ to\ J} b_j[n] u_j + w[n]$$

where,
$b_1$ is desired symbol corresponding to a specific symbol for a designated user,
$u_1$ is desired signal vector i.e. the response of the overall system, from the transmitter to the output of the sample at the receiver, to the desired symbol, restricted to the observation interval.
$b_1[n]$, for $2 <= j <= J$, are interfering symbols, which may include symbols from the designated user as well as other symbols from the designated user,
$u_j$, for $2 <= j <= J$, are interference vectors corresponding to the interfering symbols.

The number of vectors, J, depends on the number of simultaneous users K in the original model and on the length of the observation interval, For a multipath channel, the desired vector can be written as:

$$u_1 = \text{Sum}_{over\ i=1\ to\ M1} a[i] s_{d[i]}$$

where,
$a[i]$ are complex gains for the ith multipath component, $1 <= j <= M_1$ $d[i]$ are delays for the ith multipath component, $1 <= j <= M_1$
$s_d$ denotes response of the spreading waveform $s(t)$ in (1) shifted by d samples, restricted to observational interval. By convention, d=0 is taken as corresponding to first element of the spreading code being aligned with the left edge of the observation interval.

While the above model is presented in terms of an equivalent synchronous discrete-time model, it will be apparent to anyone skilled in the art that the methods disclosed can also be implemented in the continuous-time domain.

New Receiver Techniques

The method as proposed in the present invention is formulated in 802.11b DS physical layer. 802.11b DS physical layer makes multiuser detection difficult as compared to other physical layers because of two reasons. Firstly, all users employ same spreading code for transmitting their respective signals. Secondly, all users start transmission in same time slot with same sequence of training symbols. This results in collision of multiple users' symbols. The carrier sense mechanism of 802.11b prevents interference due to users that transmit in later time slots with the user(s) transmitting currently. In light of above mentioned two reasons, in training phase, spreading code or transmitted symbols cannot be directly used for distinguishing different users. The methods proposed in the present the invention use two observations as criteria for separating users:

If channel delay spread is much smaller than a symbol interval, if it is bounded by L chips, where L is much smaller than the processing gain, N, then significant multipath components separated by more than L chips are probably due to different users.

After the training period is over, different users send uncorrelated streams of data. In addition, if delays of the users are offset by several symbols, then it is possible to separate the users without the above-mentioned two criteria. This is achieved using good autocorrelation properties of well-designed sequences of training symbols. Consider a case where $t[n]$ denotes the training sequence sent by each of the K simultaneous transmissions. All symbols falling into the observation interval correspond to some element of the training sequence, i.e. $b_j[n] = t[n-n_j]$, where $n_j$ is an integer. Assuming that the training sequence has good autocorrelation properties, $1/M\ \text{Sum}_{over\ n=1\ to\ M}\ t[n] t[n-k] = 0$ for $k \neq 0$, for moderately large values of M.

Figure 2:
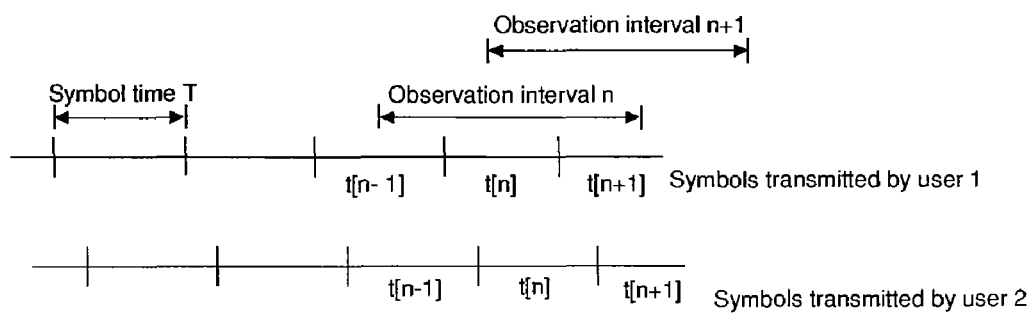
FIG. 2 shows the timing of two simultaneous transmissions of two users with the timings being closely aligned.

FIG. 1 and FIG. 2 show relative timing of two simultaneous transmissions in two distinct special cases of the model. In both cases, the observation interval is chosen to be two times the symbol interval. This ensures that regardless of the timing, one complete symbol of any transmission is guaranteed to fall into the observation interval. The spreading waveforms occupy an interval somewhat larger than the symbol interval T, and the channel may produce further dispersion, so that the overall waveform modulating one symbol is not time-limited to T. However, it is still true that approximately one complete symbol will fall in an observation interval of length 2T.

It is easier to separate the users easily in the scenario of FIG. 1 as compared to FIG. 2. In FIG. 1, timings of two simultaneous transmissions are shown. For each user three symbols fall into the observation interval. The timing of two users is offset sufficiently so that the most significant contribution to the observation interval for each user corresponds to two different symbols, $t[n+2]$ for user1 and $t[n]$ for user 2.

FIG. 2 shows transmissions of two different users with their timings closely aligned. In this case, same training symbols, $t[n]$ for both users, make major contributions in the observation interval.

Synchronization Enhancement Using Successive Interference Suppression

Synchronization is achieved by correlating the received signal against expected training signal as in a standard synchronization algorithm. The training signal consists of training symbol sequence modulating the spreading sequence. Each symbol consists of chips. Correlator output, V(d), corresponding to each delay, d, in the training signal is obtained by computing for each candidate chip delay:

$$V(d) = \text{Sum}_n t^*[n+k_d] < s_d, r[n] >$$

where, $k_d$ is the receiver's estimate of the phase of the training sequence associated with delay d, and $s_d$ is the spreading sequence, shifted by d chips.

The value of $k_d$ can be obtained by hypothesis testing among a set of possibilities for each delay d.

Figure 3:
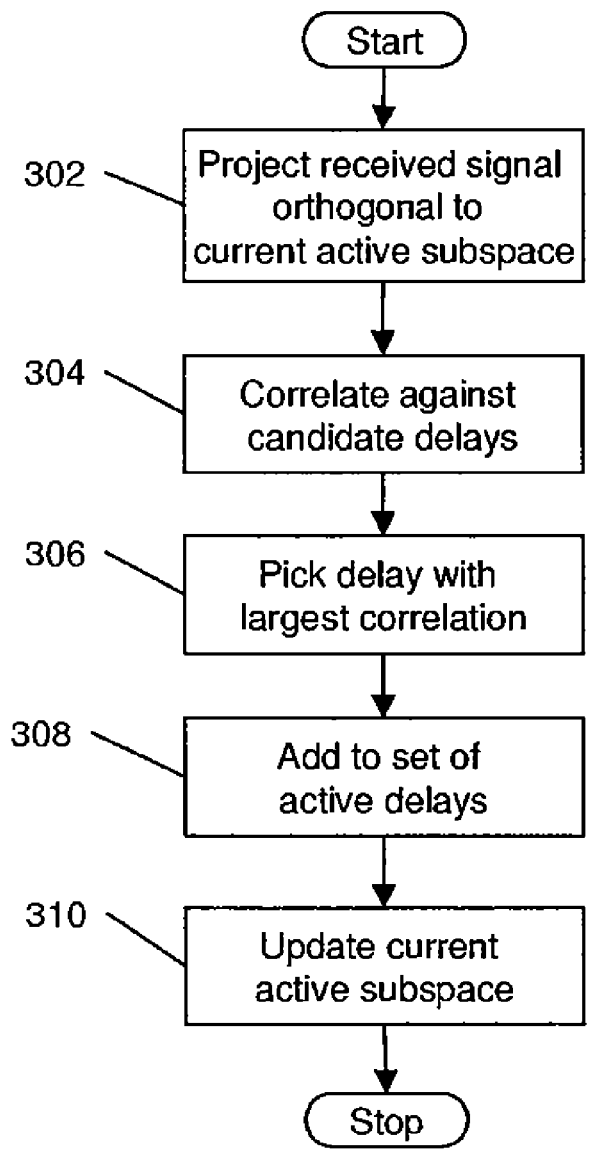
FIG. 3 shows the method for successive interference suppression for identifying the set of significant multipath components.

The peaks of correlator outputs are used to identify delays of the significant multipath components. The identification of multipath components is based on successive interference suppression. Largest peak in the correlator output is identified. The spreading sequence delayed by the delay, say $d_{max}$, corresponding to the largest peak is added to current active subspace. The active subspace at any stage is spanned by multipath components identified till that stage by the process of successive interference suppression. FIG. 3 shows the steps of successive interference suppression for identifying the set of significant multipath components. The received signal is projected orthogonal to the current active subspace at step 302 of FIG. 3. It is then correlated against all candidate delays at step 304. At step 306, the delay with largest correlation is picked. Spreading sequence delayed by $d_{max}$ is added to the current active subspace. The delay picked thus is added to the active set of delays at step 310. This process is continued till the correlation with remaining delays is insignificant compared to the correlation with the delays identified so far. The active set of delays corresponding to the significant multipath components is the output of this process. This set is further used for user separation.

User separation based on estimates of locations of significant multipath components User separation can be applied to the output of the synchronization algorithm that gives only the locations of the different significant multipath components. The active set of delays obtained at the output of the process discussed above is further grouped into clusters based on maximum delay spread of the channel. Thus delays in the active set that are within L chips of each other are assumed to be associated with a hypothesized user. The receiver implements a Rake receiver for each hypothesized user, based on delays associated with that user. An interference suppressing rake receiver can also be implemented. In the interference suppressing Rake receiver, the correlator corresponding to the Rake receiver associated with a given hypothesized user is projected orthogonal to the subspace spanned by the other hypothesized users. Each of these Rake receivers or interference suppressing Rake receivers can be run in parallel.

LMMSE-Based Synchronization

An approximation to LMMSE (Linear Minimum Mean Squared Error) correlator is computed under each timing hypothesis. The number of timing hypotheses depends on the receiver's uncertainty regarding the transmitters' timing. Hypothesis $H_j$ can be given by:

$$H_j: b_1[n] = t[n+j]$$

In a preferred embodiment, implementation of LMMSE correlator is carried out using least squares approximation. Least squares approximation to the LMMSE correlator under hypothesis $H_j$ is given by:

$$c_j = R^{-1} p_j, \text{ where}$$

$R = (1/M) \text{Sum}_{\text{over } n=1 \text{ to } M} r[n](r[n])^H$ is empirical autocorrelation matrix for the received vector sequence, and $p_j = (1/M) \text{Sum}_{\text{over } n=1 \text{ to } M} t^*[n+j]r[n]$ is the estimate of the desired vector under the hypothesized phase of the training sequence.

Hypothesis that maximizes $q_j = p_j R^{-1} p_j$ is selected to be the best hypothesis. An embodiment of this method can be found in paper titled "MMSE Interference Suppression for Timing Acquisition and Demodulation in Direct-Sequence CDMA Signals", authored by U. Madhow, published in IEEE transactions on communications, vol. 46.

In FIG. 1, large values of $q_j$ are expected for j=0 and j=2. Large value of $q_j$ for j=0 corresponds to the complete symbol of user 2 which falls into the observation interval. Large value of $q_j$ for j=2 corresponds to the complete symbol of user 1 that falls in the observation interval. Smaller values of $q_j$ are expected for j=−1 and j=1 that represent the two partial symbols of user 2 and for j=1 and j=3 that represent the two partial symbols of user 1. In FIG. 2, the symbol sequences for different users are closely aligned. Large values of $q_j$ are expected for j=0 corresponding to the complete symbol of both users falling in the observation interval. Smaller values of $q_j$ are expected for j=−1 and j=1 corresponding to the two partial symbols of both users falling into the observation interval. j=0 is considered to be the best hypothesis, however it contains significant contributions from symbols sent by both users. Once the training phase is over, these symbols would destructively interfere with each other. Since the output of the correlator in this case contains significant contributions from different users, it cannot be directly used to obtain the information sent by either user.

User Separation Using LMMSE Correlators

From all hypotheses a set of good hypothesis is selected. The best hypotheses for which $q_j$ is maximized, say $q_{max}$ are selected. Also, all hypotheses for which $q_j = a_1 q_{max}$, where $a_1 <= 1$ is a design parameter, are selected. Let the hypotheses forming the set of good hypotheses correspond to correlators $c_{j0}$ to $c_{jr}$.

Figure 4:
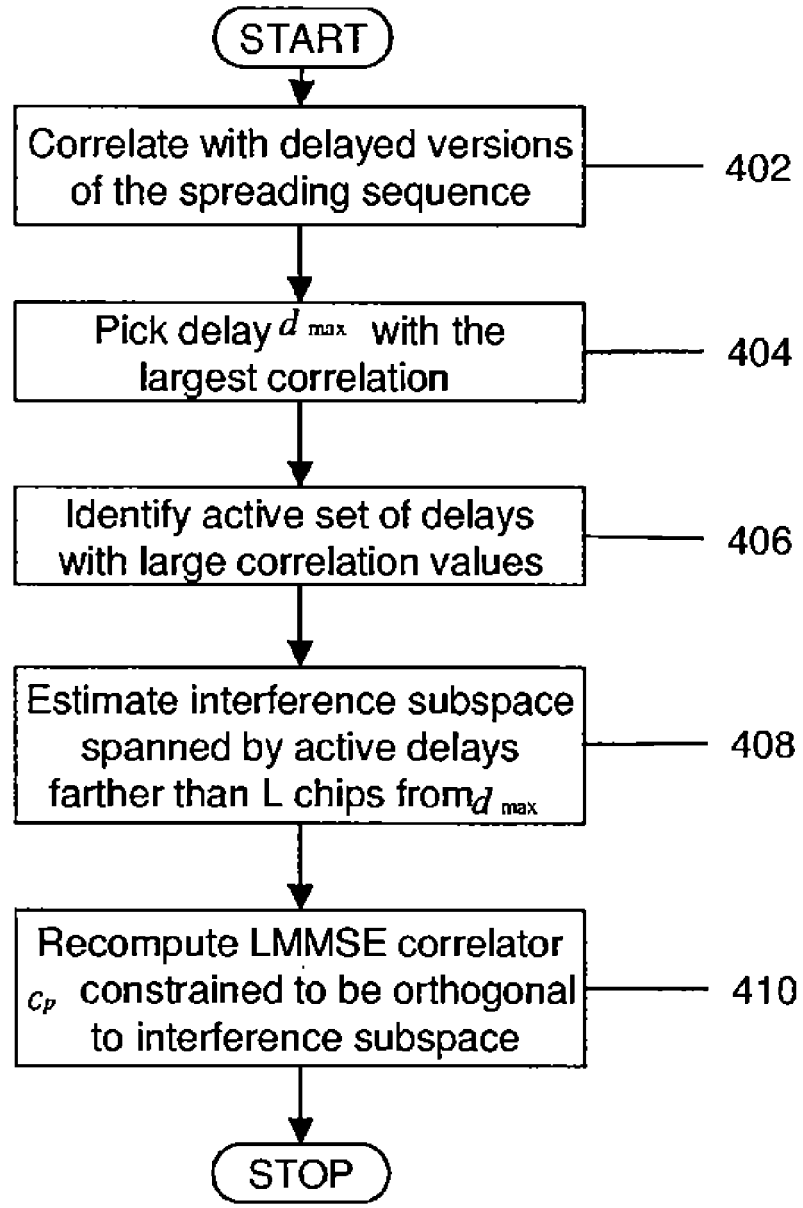
FIG. 4 shows the method for interference suppression using LMMSE correlator for finding correlators locked to individual users.

FIG. 4 represents a flowchart for finding correlators locked to individual users that. At step 402, inner product with the spreading sequence shifted by d chips is found for each correlator corresponding to good hypothesis. Here d ranges over all possible chip offsets that may correspond to a complete symbol falling into the observation interval. For a correlator, say $c_{j0}$:

$F(d) = <c_{j0}, s_d>$, is found for all possible chip offsets that may correspond to a complete symbol falling into the observation interval.

The delay at which f(d) is maximized is denoted by $d_{max}$. $d_{max}$ is identified at step 404. At step 406, all delays for which $f(d) >= a_2 f(d_{max})$ are considered to be a part of active set. Here, $a_2 <= 1$ is a design constant Based on the modeled maximum delay of L chips, the delay $d_{max}$ and active delays within L chips of $d_{max}$ are associated with a single user, termed the primary user. And, delays in the active set that are farther than L chips from $d_{max}$ are assumed to be due to other users, termed secondary users. These delays form the interference subspace for primary user. Interference subspace is identified at step 408. If there are no secondary users, then the delays in the active set that are within L chips of $d_{max}$ are used to obtain the information sent by primary user. If there are multiple users, then either their multipath components are too weak to show up in the active set or they are or their delays are within L chips of each other and cannot be distinguished.

Consider a case where there are secondary users, say at delays d1, d2, .... Let S denote the subspace spanned by the shifts of the spreading sequence $s_{d1}$, $s_{d2}$, ... associated with these users, and v1, v2 ... denote an orthonormal basis for S. LMMSE correlator for the primary user is computed again. Correlator is recomputed subject to the constraint that the correlator is orthogonal to the subspace, which contains contribution of the secondary users, at step 410. That is, correlator $c_p$ for the primary user is computed so as to minimize mean squared error $E[|<c_p, r[n]>-b_1[n]|^2]$, subject to the constraint that $c_p$ is orthogonal to the subspace S. The constraints while calculating correlator may be written as:
$E[|<c_p, r[n]>-b_1[n]|^2]$ is minimized subject to the constraint that $<c_p, v_i>=0$, for i=1, 2 ... $C_{j0}$ was calculated by using LMMSE criterion. This implies that $E[|<c_p, r[n]>-b_1[n]|^2]$ is minimized for the same desired symbol sequence. $b_1[n]=t[n+j_0]$. Correlator $c_p$, can be calculated by using standard Lagrange optimization framework:

$$c_p = c_{j0} + L_1 V_1 + L_2 V_2 + \ldots$$

where, $V_i = R^{-1} v_i$ for i=1, 2 ... and where $L_1, L_2, \ldots$ are the Lagrange multipliers chosen to satisfy the constraints on $c_p$ with equality.

The output of the correlator $c_p$ provides multipath components of the primary user only. This is due to the fact that contributions of the secondary users have been suppressed from the correlator's output by design. The constraint, $<c_p, v_i>=0$, for i=1, 2 ... suppresses the contributions of secondary users. Thus, the output of the correlator $c_p$ can be used to demodulate the information sent by primary user.

Correlators for each secondary user can be recomputed in a manner similar to that of $c_p$, shown in FIG. 4. The correlators for each secondary user are recomputed by projecting them orthogonal to the subspace spanned by the primary user and other secondary users. Once all correlators are obtained, they can operate in parallel to provide multipath components of different users. Cyclic Redundancy Check (CRC) code is used to identify which of the correlators provide useful output. At the receiver, the outputs that do not satisfy CRC code are rejected. The outputs that satisfy CRC code are forwarded to higher layers of the receiver for demodulation of user's information.

In practice, the set of correlators operating in parallel may be reduced according to requirements. For example, a correlator for only the primary user for each good hypothesis may be chosen. Also, reduction in the number of correlators can be achieved by reducing the number of good hypotheses considered by the user separation algorithm.

User Separation Using Post-Training Data Characteristics

The above mentioned user separation techniques are based on two assumptions as described earlier. The following technique only requires the assumption that after the training period is over, different users send uncorrelated data. This user separation technique partitions the active set of delays into different users. Each user is assigned a subnet of delays from the active set.

According to this technique, a correlator that generates a sequence of demodulation statistics is implemented corresponding to each active delay. Output of the correlator corresponding to ith active delay, for I=1, 2, ... Q is:

$$Z_i[n] = <s_{d_i}, r[n]>$$

If any two delays in the active set, say $d_k$ and $d_l$, correspond to the same user, then their corresponding demodulation statistics, $Z_k[n]$ and $Z_l[n]$, are expected to be highly correlated. On the other hand, if any two delays correspond to different users, then their corresponding demodulation statistics are expected to have low correlation once the training period is over.

The implementation of correlation criterion is as follows. Cross correlation between two vectors x and y is defined as:

$$P(x,y) = |<x,y>|/\|x\|\|y\|$$

Where $\|x\| = $ sqrt of $<x, x>$ denotes the norm of x.

The correlation statistic between two delays $d_k$ and $d_l$ in the active set is defined as:

$$R(k,l) = p(z_k, z_l)$$

Where, $$z_k = (Z_k[M_1+1], Z_k[M_1+2], \ldots Z_k[M_1+M_2]) \text{ and}$$

$$z_l = (Z_l[M_1+1], Z_l[M_1+2], \ldots Z_l[M_1+M_2])$$

are vectors of demodulation statistics corresponding to the two delays, $d_k$ and $d_l$ over an interval spanning $M_2$ after the training period is over. For each pair (k, l), r(k, l) is compared to a threshold, r*. If r(k, l) exceeds r*, then decision is made that the two delays correspond to the same symbol of the same user. For large values of $M_2$, the threshold r* can be set to small value, like ¼. The appropriate value of threshold r* is determined through experimentation.

Demodulation after User Level Grouping

The techniques discussed so far in this invention are methods for synchronization and user separation at the receiver's end, despite all users employing same spreading code and training sequence. Once synchronization and user-level grouping of the significant multipath components is achieved, a variety of standard demodulation methods can be employed.

After synchronization and user-level grouping, the information available for a given user may be either the locations of its significant multipath components, or the locations and complex gains for its significant multipath components. In the latter case, delays $d_{k,1} \ldots d_{k,n}$ and the complex gains $a_{k,1} \ldots a_{k,n}$ are available. From this information the signal sent by user $u_k$ can be constructed as $u_k = a_{k,1} s_{k,1} + \ldots + a_{k,1} s_{k,n}$, where $s_{k,n}$ is the spreading sequence delayed by $d_{k,n}$ chips. Several symbols for user k can fall within a given observation interval. In the preferred embodiment, the delays, $d_{k,1} \ldots d_{k,n}$, and signal vector, $u_k$, correspond to the symbol with most significant contribution in the observation interval. Shifts of the delays and the signal vector by the symbol interval give rise to the delays and signal vectors corresponding to the other symbols of user k within the observation interval. These other symbols act as intersymbol interference for the most significant symbol of the user in the observation interval.

Ignoring the interference structure, standard noncoherent rake reception can be used in case only the delays, $d_{k,1} \ldots d_{k,n}$, are available and coherent rake reception can be used in case both delays and complex gains are available. A number of standard multiuser detection techniques can also be used. One such technique is decorrelating detection, as discussed in paper titled "Linear multiuser detectors for synchronous code-division multiple-access channels," by R. Lupas and S. Verdu, published in IEEE Transactions on Information Theory, vol. 35. This technique consists of correlating the received vector against a correlator for user k that is orthogonal to the interference subspace seen by that user, where this is defined as the space spanned by the significant interference vectors seen by the symbol of user k that has the most significant contribution in the observation interval. In case only the delays, $d_{k,1} \ldots d_{k,n}$, are available, the interference subspace may be estimated to be the span of the vectors $s_d$, where d ranges over the delays corresponding to the significant multipath components for the intersymbol and multiple-access interference. In case both delays and complex gains are available, the interference subspace may be estimated to be the span of $u_j$, where j ranges over all users other than k. Knowing the channel gains enables reduction of the dimension of the estimated interference subspace, and hence reduction of the amount of noise enhancement due to decorrelation. A number of other schemes like nonlinear interference cancellation techniques can also be used and should be apparent to anyone skilled in the art.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method
for separating signals from multiple users in a direct sequence spread spectrum communication system in which said multiple users each use a substantially equal spreading code, said method comprising steps of, at a receiver coupled to said communication system:
receiving a signal modulated by symbols;
partitioning the signal into a set of delays;
determining a correlation statistic between the delays;
comparing the correlation statistic to a predetermined value wherein a high correlation indicates the delays are from the same user;
identifying a plurality of significant signal components in response to successive steps of interference suppression; and
associating, each with a distinct user, one or more of said significant signal components;
wherein
said steps of successive interference suppression include steps of
identifying a delay of signal components having a largest correlation;
adding the delay of the signal component having the largest correlation to a current active set of delays, active set of delays being a set of delays of the significant signal components;
updating the current active subspace by adding spreading sequence shifted by the delay of the signal component having largest correlation; and
projecting the received vector orthogonal to current active subspace.

2. A method as in claim 1 wherein said step of determining a correlation statistic includes the steps of:
generating a sequence of demodulation statistics, each said demodulation statistic corresponding to a delay in an active set of delays;
computing a demodulation statistic vector corresponding to said sequence of demodulation statistics;
computing correlation statistic between all demodulation statistic vectors considering a pair of delays in the active set of delays at a time.

3. The method of claim 1 further including:
applying said delays having a correlation statistic greater than or equal said predetermined value to a rake receiver associated with said same user.

4. A method as in claim 1, wherein
said steps of successive interference suppression are performed during a training signal;
wherein the training signal consists of training symbols modulating the spreading code, each training symbol consisting of chips.

5. A method as in claim 1, wherein
said steps of identifying significant signal components include steps of
associating multi-path components in an active set of delays that are with a predetermined number of chips apart from another user.

6. A method
for separating signals from multiple users in a direct sequence spread spectrum communication system in which said multiple users each use a substantially equal spreading code, said method comprising steps of, at a receiver coupled to said communication system:
receiving a signal modulated by symbols;
partitioning the signal into a set of delays;
determining a correlation statistic between the delays;
comparing the correlation statistic to a predetermined value wherein a high correlation indicates the delays are from the same user;
identifying a plurality of significant signal components in response to successive steps of interference suppression; and
associating, each with a distinct user, one or more of said significant signal components;
wherein
said steps of identifying significant signal components include steps of
identifying one or more correlations within the signal, and
associating the identified correlations with distinct users, each said distinct user being identified by one or more separate multi-path components;
and wherein
said steps of identifying one or more correlations include steps of
computing inner product of the linear minimum mean squared error correlation with spreading sequence separated by d chips, where d ranges over all possible chip offsets that may correspond to a complete symbol falling into observation interval;
identifying delay for which output of the inner product is maximized;
identifying all delays, as part of an active set of delays, for which output of the inner product is more than a predetermined threshold;
associating the delays that are within a predetermined number of chips apart from the delay for which the output of the inner product is maximized with a primary user;
estimating interference subspace spanned by the delays that are farther than the predetermined number of chips apart from the delay for which the output of the inner product is maximized, the interference subspace comprising of contributions from secondary users; and
recomputing a correlation locked to the primary user that minimized mean squared error, subject to the constraint that the correlation is orthogonal to the interference subspace.

7. A method as in claim 6, wherein said step of determining a correlation statistic includes the steps of:
  generating a sequence of demodulation statistics, each said demodulation statistic corresponding to a delay in an active set of delays;
  computing a demodulation statistic vector corresponding to said sequence of demodulation statistics;
  computing correlation statistic between all demodulation statistic vectors considering a pair of delays in the active set of delays at a time.

8. A method as in claim 6, further including:
  applying said delays having a correlation statistic greater than or equal said predetermined value to a rake receiver associated with said same user.

9. A method as in claim 6, wherein
  said steps of successive interference suppression are performed during a training signal;
  wherein the training signal consists of training symbols modulating the spreading code, each training symbol consisting of chips.

10. A method as in claim 6, wherein
  said steps of identifying significant signal components include steps of
  associating multi-path components in an active set of delays that are with a predetermined number of chips apart from another user.

* * * * *